United States Patent [19]

Karr, III et al.

[11] Patent Number: 4,647,146
[45] Date of Patent: Mar. 3, 1987

[54] INTERCONNECTION OF OPTICAL FIBER CABLES

[75] Inventors: Michael A. Karr, III, New Providence; Frank H. Levinson, Whippany, both of N.J.

[73] Assignee: Bell Communications Research, Inc., Livingston, N.J.

[21] Appl. No.: 651,114

[22] Filed: Sep. 17, 1984

[51] Int. Cl.⁴ .......................... G02B 6/26; G02B 6/42
[52] U.S. Cl. ................... 350/96.15; 350/96.20
[58] Field of Search ............... 350/96.15, 96.20, 96.21, 350/96.29

[56] References Cited

U.S. PATENT DOCUMENTS

| | | | |
|---|---|---|---|
| 4,021,097 | 5/1977 | McMahon | 350/96 C |
| 4,136,929 | 1/1979 | Suzaki | 350/96.15 |
| 4,212,512 | 7/1980 | Hodge | 350/96.15 |
| 4,253,727 | 3/1981 | Jeunhomme et al. | 350/96.15 |
| 4,302,071 | 11/1981 | Winzer | 350/96.20 |
| 4,330,170 | 5/1982 | Johnson et al. | 350/96.16 |
| 4,378,951 | 4/1983 | Nagao | 350/96.15 |
| 4,449,781 | 5/1984 | Lightstone et al. | 350/96.15 |
| 4,457,581 | 7/1984 | Johnson et al. | 350/96.15 |
| 4,482,203 | 11/1984 | Stowe et al. | 350/96.15 |
| 4,556,855 | 12/1985 | Chiang et al. | 350/96.15 |
| 4,593,968 | 6/1986 | Giallorenzi | 350/96.20 |

OTHER PUBLICATIONS

Applied Optics, vol. 17, No. 13, Jul. 1, 1978—"Multimode Fiber Coupler", K. Ogawa and A. R. McCormick, pp. 2077-2079.

The Bell System Technical Journal, vol. 56, No. 5, May/Jun. 1977—"Simplified Theory of the Multimode Fiber Coupler", K. Ogawa, pp. 729-745.

Primary Examiner—William L. Sikes
Assistant Examiner—Robert E. Wise
Attorney, Agent, or Firm—James W. Falk; John T. Peoples

[57] ABSTRACT

An optical fiber coupler (10) is disclosed for interconnecting a tap cable (20) to a bus cable (30). Each cable has a portion of its sheath removed at the point of coupling to provide exposed cores (24,34). The cores are intertwined a number of times and the tension on the cables is adjusted to yield the desired loss. A cladding material fills the intertwined region, including the interstices of the cores, to provide a continuous sheath in the axial dimension.

10 Claims, 1 Drawing Figure

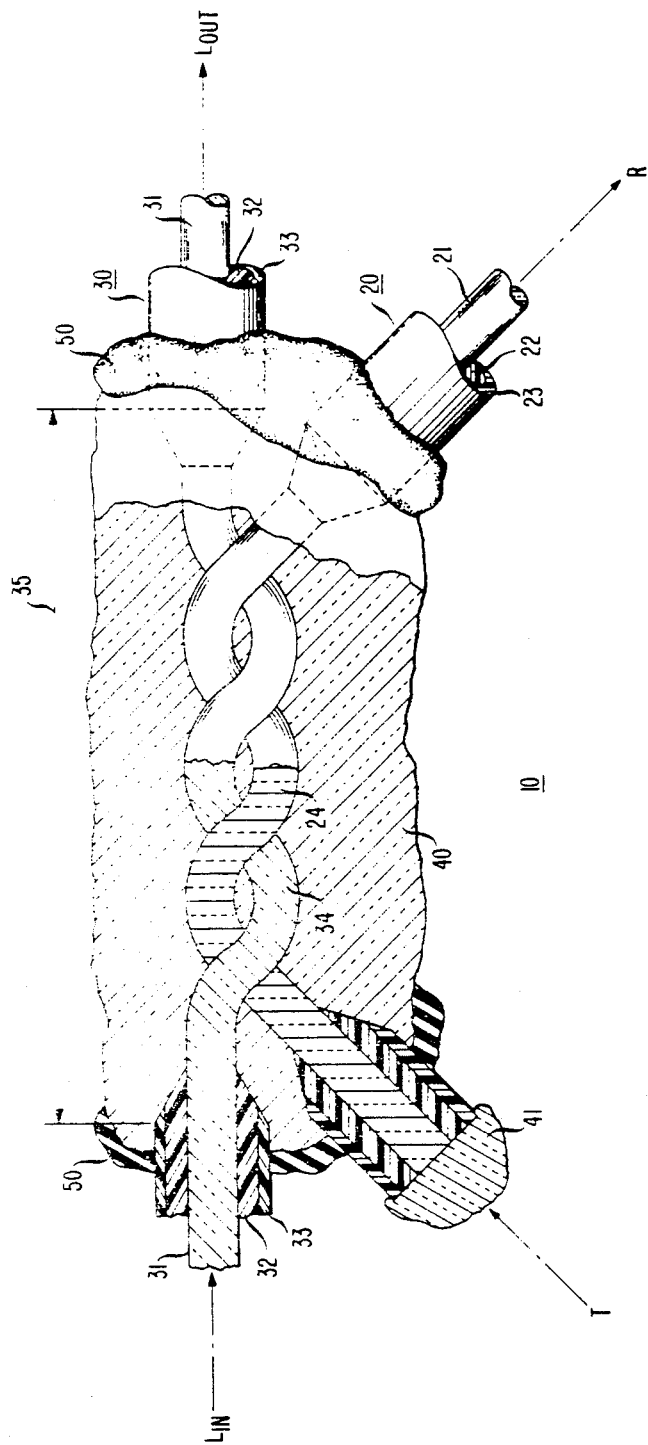

INTERCONNECTION OF OPTICAL FIBER CABLES

Field of the Invention

This invention relates generally to an optical fiber communication system and, in particular, to a structure and methodology for optically coupling fiber cables.

Background of the Invention

A conventional optical bus system for the distribution of video or data signals requires, at each distribution node, an arrangement to couple the signals from the bus fiber to a receiving element such as a tap fiber. Oftentimes the coupling arrangement is a passive, connectorized coupler device. One drawback in utilizing this device is the necessity of first severing the bus fiber. Connectors emanating from the device are then attached to the free ends of the bus fiber in order to reestablish the bus transmission path through the device. A coupling element internal to the device also diverts light energy to another port terminated by a connector. This latter connector is attached to the receiving element. Because of the optical loss associated with the coupler as well as the losses of the fiber connectors, only a few nodes (e.g., about ten) may be formed on the bus before regeneration is required.

Other techniques are available for directly coupling two fibers without the requirement of cutting the fiber, thereby eliminating connector losses. However, such techniques are not particularly well-suited for reliable installation in a field environment because, for instance, precise alignment of the fibers must be permanently maintained or delicate preparation of the fibers is required. Moreover, with many of the techniques the coupling excess losses remain high.

One representative reference, entitled "Multimode Fiber Coupler" and published in *Applied Optics*, July, 1978 by K. Ogawa and A. R. McCormick, describes two direct coupling arrangements, namely, the cross-type coupler and the parallel-type coupler. With the cross-coupler, the cladding from two plastic-clad fibers, serving as the bus cable and the tap cable, is removed by a sharp instrument and the two exposed cores are carefully placed one above the other so as to contact at a given angle. The cross-coupler does not achieve a high coupling because of its short coupling length even as the contact angle is varied over an extensive range.

The coupling between the fibers may be increased if the exposed cores are juxtaposed over an extended length. This arrangement is called the parallel coupler; a more detailed description of this coupler is presented in an article entitled "Simplified Theory of Multimode Fiber Coupler", *The Bell System Technical Journal*, Vol. 56, No. 5, May–June 1977 by K. Ogawa. To construct this structure, each fiber is attached to an acrylic base and the cladding is then removed over the required coupling length. The two identical fibers, each mounted on its acrylic base, are placed side-by-side over their exposed lengths. Silicone of the same type as the fiber cladding is then introduced to form a common cladding filling the coupling region. The degree of coupling is affected by the interaction gap between the exposed cores and it is not practical to produce and maintain the required uniform interaction gap over the coupling length.

U.S. Pat. No. 4,449,781, issued May 22, 1984 to Lightstone et al, discloses a coupler including at least two biconically tapered fibers. The biconical sections of each fiber are generally twisted around one another, stretched and then fused together by heating. Each fiber comprises a glass core having a high index of refraction and a glass cladding with a low index of refraction. In preparing the fiber for fusing, it is necessary to remove a portion of the cladding. This is generally accomplished by chemical etching or the like. It is critical that the cladding not be removed completely since the chemical that attacks the glass cladding will also attack the glass core. This results in a core that is brittle so that the operation of twisting may damage or even break the glass core. In addition, even for the case of partially reduced cladding, the resultant structure is less durable because of the structures caused by stretching and the resulting imperfections due to the cladding removal process.

SUMMARY OF THE INVENTION

The above disadvantages of conventional coupling arrangements are obviated in accordance with the present invention of a coupler, which in its structural aspect, comprises intertwined cores from a bus cable and a tap cable and a cladding material filling at least the interstices of the cable cores within the intertwined region. In accordance with its method aspect, the invention is the methodology for achieving the foregoing structure. In broad terms, the method includes the steps of intertwining fiber cables having exposed cores over a preselected length and of applying a cladding material to the exposed cores for mechanical stability and low optical loss.

The organization and operation of this invention will be better understood from a consideration of the detailed description of an illustrative embodiment thereof, which follows, when taken in conjunction with the accompanying drawing.

BRIEF DESCRIPTION OF THE DRAWING

The sole FIGURE depicts the coupler arrangement in accordance with the structural aspect of the present invention.

It will be appreciated that for purposes of illustration, this FIGURE is not necessarily drawn to scale.

DETAILED DESCRIPTION

Coupler 10 in accordance with the structural aspect of the present invention is shown in the FIGURE. In this illustrative embodiment, fibers 20 and 30 are multimode optical fibers comprising round, constant index silica cores 21 and 31, respectively, surrounded by silicone claddings 22 and 32 and encased with nylon outer jackets 23 and 33, respectively. A representative fiber is the ANHYDROGUIDE type produced by Fiberguide Industries, Sterling, N.J. The core diameter for this particular fiber is 200 microns, the cladding thickness is 50 microns and the jacket thickness is 25 microns, resulting in a cable having an overall diameter of 350 microns. The index of refraction for the core is about 1.458 whereas the cladding has an index of about 1.405. Since the cladding has a lower index of refraction, the cladding acts as a light barrier and light waves propagating in the core are reflected by this barrier.

Elongated portions of claddings 22 and 32 and jackets 23 and 33 have been removed from fibers 20 and 30, respectively, over a predetermined length, depicted by dimension 35. This removal is generally effected by chemical action, typically with the use of hot sulfuric acid; this acid dissolves silicone and nylon but does not attack glass. With the cladding and jacket removed, exposed core 24 on tap fiber or cable 20 and exposed core 34 on bus fiber or cable 30 are defined over an axial length of about 2 cm. Exposed core 24 typically appears proximate to a free end of tap cable 20 whereas exposed core 34 is at an intermediate point along the length of bus cable 30. Exposed core 24 is intertwined or wrapped several times, typically by hand, around exposed core 34 in one direction (twice counterclockwise as shown in the FIGURE). Wherever the exposed cores are in contact, light waves impinging on the outer surfaces of exposed core 34 are transmitted through to exposed core 24 since there is basically no mismatch in the indices of refraction of the two media. As a result of this coupling mechanism, higher order modes are coupled more readily than lower order nodes. To achieve the desired coupling, the contact surface area is adjusted appropriately, such as by varying the number of twists or the tension on the fibers.

This coupling arrangement also has directional properties. For instance, lightwaves transmitted by cable 30, in the direction shown by $L_{in}$ in the FIGURE, result in received light energy $L_{out}$ and R emanating from the right ends of bus 30 and tap 20, respectively. However, essentially no light is emitted from the left end of core 21. Similarly, light energy T propagating from the left in tap 20 is coupled to the right ends of bus 30 and tap 20, respectively.

Cladding material 40 fills at least the interstices and covers the exposed surfaces of exposed cores 24 and 25 over dimension 35 to effect low loss as well as mechanical stability and protection. A representative cladding material is type F-100 also produced by Fiberguide Industries. A small amount of the same cladding material or epoxy may also be applied to the free end of core 21 in the form of a hemisphere as depicted by nodule 41. This mitigates reflections from the free end. Also a small amount of epoxy 50 may be applied for strain relief at each end of the region defined in its axial dimension by length 35.

During the process of constructing coupler 10, light energy ($L_{in}$) may drive bus 30. The power received on bus 30 ($L_{out}$) and at the output of tap 20 (R) may be monitored with an appropriate optical measuring device and the coupling loss or degree of coupling can be selected by varying the number of wraps and the tension on tap 20 relative to the tension on bus 30 until cladding material 40 solidifies. The number of twists primarily controls the degree of coupling, whereas the tensioning produces a small variation to the primary coupling. For instance, in one exemplary case, four twists provide about ten dB of coupling, that is, ten percent of the input power $L_{in}$ is received on tap 20 as power R. Tensioning of fiber cables 20 and 30 improves coupling by about 0.5 dB. Moreover, the excess insertion loss for this particular case is about 0.2 dB.

Whereas the above description relates to a single coupling arrangement or node, it is to be appreciated that a network of nodes similar to that represented by the FIGURE may be constructed along bus cable 30. Because coupler 10 has small excess insertion loss, numerous taps or nodes (e.g., about 50) are possible without signal regeneration.

It is to be understood that the optical coupling arrangement, and associated methodology, described herein is not limited to the specific forms disclosed by way of illustration, but may assume other embodiments limited only by the scope of the appended claims.

What is claimed is:

1. A method for coupling two multimode, plastic-clad fiber optic cables to form a tapped connection, said method characterized by the steps of
    removing a portion of the cladding from each of said cables to expose each cable core over a prescribed length,
    intertwining one said exposed core with the other a predetermined number of times and in such a manner that said exposed cores are in surface contact relation, and
    applying a cladding material within at least the interstices of the intertwined cores to bond together said cores in surface contact relation over said prescribed length.

2. A method for optically linking a multimode, plastic-clad tap cable to a multimode, plastic-clad bus cable, said method characterized by the steps of
    removing a portion of the cladding from both said tap cable and said bus cable to provide exposed cores over substantially the same fixed length,
    twisting said exposed cores a preselected number of turns and in such a manner that said exposed cores are in direct contact relation to form a tap junction,
    adjusting the tension on said tap cable relative to said bus cable within said junction to select a predetermined coupling loss between said bus cable and said tap cable, and
    filling said tap junction with a cladding material to bind said cores in said direct contact relation and to protect said cores.

3. A method for coupling a plastic-clad, silica-core multimode tap cable to a plastic-clad, silica-core multimode bus cable characterized by the steps of
    removing the cladding from portions of said tap cable and said bus cable to define exposed silica cores,
    intertwining said exposed cores for a predetermined number of turns and in such a manner that said exposed cores are in surface contact relation so as to form a distribution node, and
    applying a cladding material to said cores within the region of said node to bind said exposed cores in said surface contact relation so as to provide structural stability and low loss.

4. The method as recited in claim 3 further characterized by adjusting the tension on said tap cable relative to said bus cable before said step of applying to effect a predetermined coupling loss.

5. The method as recited in claim 4 wherein said step of removing includes the step of chemically dissolving said plastic with an agent non-reactive with said silica.

6. A method for providing an optically coupled node characterized by the steps of
    supplying two round, constant index, plastic clad and nylon jacketed silica fibers, each of said fibers having substantially the same cross-sectional characteristics and supporting multimode propagation,
    removing said plastic and nylon from each of said fibers with an agent nonreactive with silica to provide exposed cores over a preselected length,
    intertwining one of said cores with the other a given number of times and in such a manner that said exposed cores are in direct contact relation,
    adjusting the tension on said cores to achieve a predetermined coupling loss, and applying a bonding material having characteristics substantially the same as said plastic to entirely cover said exposed cores while maintaining said tension and said contact relation.

7. A method for optically interconnecting a multimode bus cable with a plurality of multimode tap cables with each of said tap cables having an exposed core over a predetermined length and said bus cable having regions of exposed core in correspondence to the number of tap cables, said method characterized by the steps of (a) intertwining said exposed core of one of said tap cables with said exposed core of said bus cable a predetermined number of times in a preselected one of said regions and in such a manner that said exposed cores are in direct contact relation so as to form a node, (b) applying a cladding material to said node to bind said cores in said direct contact relation, (c) repeating steps (a) and (b) for the remaining ones of said tap cables.

8. The method as recited in claim 7 further characterized by the step of adjusting the tensions on said one of said tap cables and said bus cable before said step of applying to provide a coupling loss at said node which is less than a given threshold.

9. An optical structure comprising a multimode bus fiber (30) and a multimode tap fiber (20) each having an exposed core (e.g., 24) intertwined in surface contact relation with the other exposed core (e.g., 34) a predetermined number of times, and a cladding material (40) disposed within at least the interstices of said cores to bind said cores in said surface contact relation.

10. An optical fiber node comprising two round, constant index, plastic and nylon clad multimode optical fibers (20,30) having substantially the same cross-section, each of said fibers having portions of its core exposed (24,34) with one said exposed core twisted about and in direct contact relation with the other a preselected number of times, and a cladding material (40) of substantially the same characteristics as said plastic surrounding said twisted cores to maintain said direct contact relation and to provide a continuous plastic sheath.

* * * * *